(12) United States Patent
Jensen et al.

(10) Patent No.: US 8,210,825 B2
(45) Date of Patent: Jul. 3, 2012

(54) HEATED ENGINE NOSE CONE USING SPIRAL CHANNELS

(75) Inventors: Joseph M. Jensen, Torrance, CA (US); James D. Bolla, Mission Viejo, CA (US); Joseph T. Humphrey, Redondo Beach, CA (US); Steve H. Nguyen, Lake Forest, CA (US)

(73) Assignee: Honeywell International Inc., Morristown, NJ (US)

( * ) Notice: Subject to any disclaimer, the term of this patent is extended or adjusted under 35 U.S.C. 154(b) by 1620 days.

(21) Appl. No.: 11/837,787

(22) Filed: Aug. 13, 2007

(65) Prior Publication Data

US 2008/0279688 A1    Nov. 13, 2008

Related U.S. Application Data

(60) Provisional application No. 60/917,591, filed on May 11, 2007.

(51) Int. Cl.
*F02C 7/047* (2006.01)

(52) U.S. Cl. ............... 416/245 R; 416/244 A; 60/39.08

(58) Field of Classification Search ............ 415/110, 415/114, 116, 175, 176, 177, 178; 416/90 R, 416/90 A, 94, 95, 244 A, 245 R; 60/39.08, 60/39.093, 267

See application file for complete search history.

(56) References Cited

U.S. PATENT DOCUMENTS

| | | | | |
|---|---|---|---|---|
| 3,834,157 | A * | 9/1974 | Hoffmann | 60/39.093 |
| 4,080,785 | A * | 3/1978 | Koff et al. | 60/226.3 |
| 4,525,995 | A | 7/1985 | Clark | |
| 5,011,098 | A * | 4/1991 | McLaren et al. | 244/134 B |
| 5,623,821 | A | 4/1997 | Bouiller | |
| 5,746,580 | A | 5/1998 | Parker et al. | |
| 6,503,056 | B2 | 1/2003 | Eccles et al. | |
| 6,593,547 | B1 | 7/2003 | Raad | |
| 7,581,378 | B2 * | 9/2009 | Brand et al. | 60/39.093 |
| 7,647,761 | B2 * | 1/2010 | Gauthier et al. | 60/39.08 |

* cited by examiner

*Primary Examiner* — Edward Look
*Assistant Examiner* — Ryan Ellis
(74) *Attorney, Agent, or Firm* — Robert Desmond, Esq.

(57) ABSTRACT

A nose cone of a turbomachine, such as an aircraft engine, is heated to prevent ice formation. The nose cone is configured as a conical shell positioned concentrically over an inner shell with a space therebetween. Spiral spacers in the space provide distributed passages through which heated lubricating oil flows. A system for separating entrained air from the lubricating oil as part of this mechanism is disclosed.

17 Claims, 5 Drawing Sheets

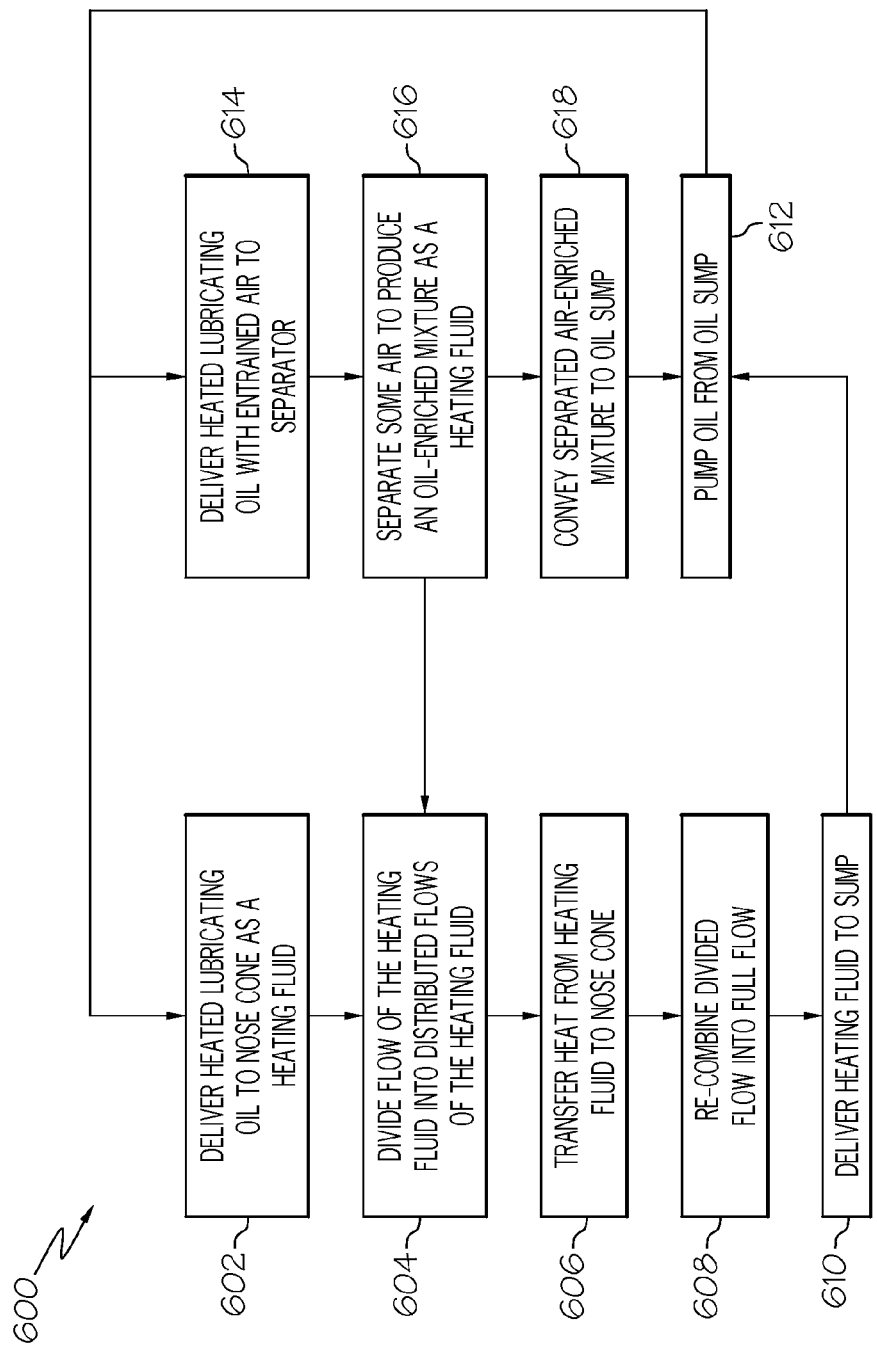

HEATED ENGINE NOSE CONE USING SPIRAL CHANNELS

CROSS REFERENCE TO RELATED APPLICATIONS

This application claims the benefit of U.S. Provisional Application No. 60/917,591 filed May 11, 2007.

BACKGROUND OF THE INVENTION

The present invention is in the field of turbomachinery and, more particularly, turbomachinery which may be susceptible to surface icing with particular applications of aircraft propellers.

Certain components of turbomachinery may be subjected to a flow of cold, moisture laden air which may produce an undesirable formation of ice. One example of such a component may be a nose cone of an engine of an aircraft. To counteract formation of ice, nose cones may be provided with integral heating systems.

Various heating systems have been described in the prior art. An electrical heating system is described in U.S. Pat. No. 6,503,056 (Eccles et al. Jan. 7, 2003). In this system an engine is provided with an integral generator that may produce power to energize an electric heater in a nose fairing of an aircraft. In U.S. Pat. No. 5,573,378 (Barcza, Nov. 12, 1996), nose cone deicing may be provided when compressor bleed air is applied to a plenum that surrounds an inlet of an engine. In these prior art deicing systems, engine performance is diminished. When energy is consumed in the production of bleed air or electrical heating it is not available to produce forward thrust for aircraft propulsion.

Some prior art attempts have been made to perform deicing without adversely effecting engine performance. One such prior-art method employs engine lubricating oil as a heat source for nose cone deicing. In this prior-art method, oil which may be normally circulated into bearings and gearing of an engine may become heated during its normal lubricating function. The heated oil may then be directed to a nose cone where some of the latent heat of the oil may heat the nose cone. In a typical prior-art heating system, the oil may be passed through serpentine tubing in contact with various portions of the nose cone.

This engine-oil deicing method may be advantageous in that it ostensibly may not diminish engine performance. It may use heat that is inherently produced by the engine from its normal operation. Nevertheless when engine oil flows through the prior-art de-icing systems, a high pressure drop may be produced in the oil flow. This may be due to various factors. For example, a de-icing system that utilizes serpentine tubing may require oil to flow over a very long path with a high velocity as it travels through the tubing. Typically the tubing is positioned to cover substantially the entire outer surface of a nose cone to insure intimate contact with the areas on which ice may form. This lengthy travel may produce a high pressure drop.

In addition, air may become entrained in the oil when it passes through bearings and gearing. In some cases, an air-oil mixture emerging from bearings and gearing may comprise 5 parts air to one part oil. A mixture of air and oil may be an ineffective heat transfer medium to insure proper heating of the surfaces. As the air-oil mixture flows though heat transfer passages, the air may become the predominant heat transfer fluid because the air may migrate radially outwardly and produce ineffective cooling. Also, a mixture with a high volume of air may experience a high pressure drop during its transit through the passages. A high pressure drop in the air-oil mixture may present a need to provide additional oil pump pressure. Producing such additional pressure may require added energy and thus may contribute to diminished engine performance. Additionally, if some of the air can be separated from the mixture before re-introducing the air-oil mixture into the bearing location, some improvement in lubricating action may beneficially occur.

As can be seen, there is a need to provide a deicing system that may operate without diminishing engine performance. Additionally, there is a need to provide an engine-oil deicing system in which entrained air is not the predominant heat transfer medium.

SUMMARY OF THE INVENTION

In one aspect of the present invention, an apparatus for heating a component of a turbomachine comprises an outer shell and an inner shell. The inner and outer shells are positioned concentrically to provide a space between the shells. Spacers are positioned in the space to form distributed passages for flow of a heating fluid.

In another aspect of the present invention, an apparatus for heating a nose cone of a turbomachine with a fluid mixture of lubricating oil and entrained air comprises an air-oil separator positioned within the nose cone In still another aspect of the present invention, a method for deicing a component of a turbomachine comprises the steps of delivering engine lubricating oil from the engine into the component as a heating fluid, dividing a flow of the heating fluid into distributed passages for the heating fluid, and transferring heat from the heating fluid into the component from the distributed passages.

These and other features, aspects and advantages of the present invention will become better understood with reference to the following drawings, description and claims.

BRIEF DESCRIPTION OF THE DRAWINGS

FIG. 6 is a flow chart of a method of deicing a turbomachine component in accordance with the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful for deicing or preventing ice formation on components of turbomachinery. More particularly, the present invention may provide a low-energy method for heating a nose cone of a turbine engine. The present invention may be particularly useful in vehicles such as aircraft in which ice formation on engine components may be problematic.

In contrast to prior-art de-icing systems, among other things, the present invention may provide heating with engine oil which produces only a small pressure drop of the engine oil as it passes through heat exchange passages. The present invention may, instead of serpentine tubing, utilize spiral flow passages formed between concentric elements to carry heated oil to various portions of the nose cone. Additionally, the present invention may incorporate apparatus which removes air from an air-oil mixture. The present invention may also incorporate a method of deicing or preventing ice formation on engine components.

Figure 1:
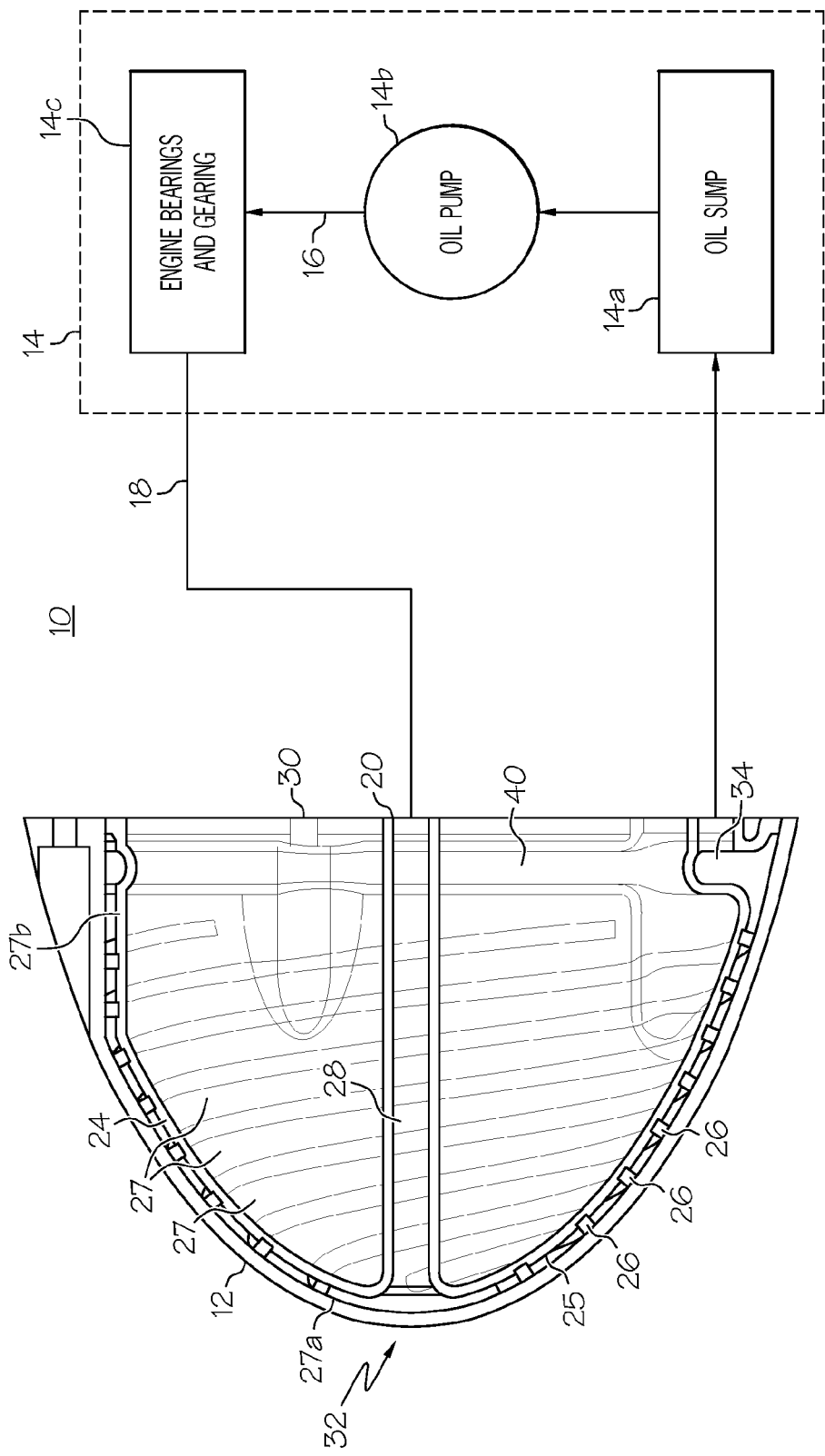
FIG. 1 is partial cross-sectional and block diagram view of a deicing system in accordance with the invention.

Referring now to FIG. 1, a block diagram and a partial cross-section view illustrate relevant portions of a turbomachine 10. A component 12 that may require de-icing may be in communication with a lubricating oil system 14 of the turbomachine 10. The system 14 may comprise an oil sump 14a, an oil pump 14b and an active lubrication region 14c which may comprise bearings and gearing of the turbomachine 10. Lubricating oil 16 may be drawn from the sump 14a by the pump 14b. The pump 14b may pressurize the oil 16 for delivery to the region 14c. In an exemplary embodiment of the invention the component 12 may comprise a nose cone of an aircraft engine. Or the component 12 may comprise a portion of a fairing of an engine or other structure requiring anti-ice formation protection. For purposes of illustrating the present invention, the component 12 may be hereinafter be referred to as a nose cone 12.

As the lubricating oil 16 passes through the region 14c, heat is added to the oil 16 because of contact with high temperature engine parts. Additionally, air is entrained into the oil 16 during the performance of its normal lubrication functions. A fluid mixture or an air-oil mixture 18 emerges from the region 14c. This air-oil mixture 18 is driven, by pressure from the pump 14b, to an inlet 20 of the nose cone 12.

The nose cone 12 may be configured as an outer conical shell. The nose cone 12 may be positioned concentrically over an inner shell 24. The nose cone 12 and inner shell 24 may be concentrically arranged with a space 25 between them. The nose cone 12 and inner shell 24 may be spaced from one another with spacers 26. The air-oil mixture 18 may pass through an inlet tube 28 from a proximal end 30 of the nose cone 12 to a distal end 32 of the nose cone 12. At the distal end 32, the mixture 18 may pass into the space 25 between the nose cone 12 and inner shell 24. After the mixture 18 passes through the space 25, it may emerge from an exit 34 and return to the sump 14a.

As the mixture 18 passes through the space 25, heat from the mixture 18 may transfer into the nose cone 12. In that regard the mixture 18 may be referred to as a heating fluid. Heat transfer from the mixture or heating fluid 18 may prevent ice formation on nose cone 12. Or alternatively, any ice which may be accumulated on the nose cone 12 may be melted. In either case, heating of the nose cone 12 may be considered to perform a de-icing function.

Figure 2:
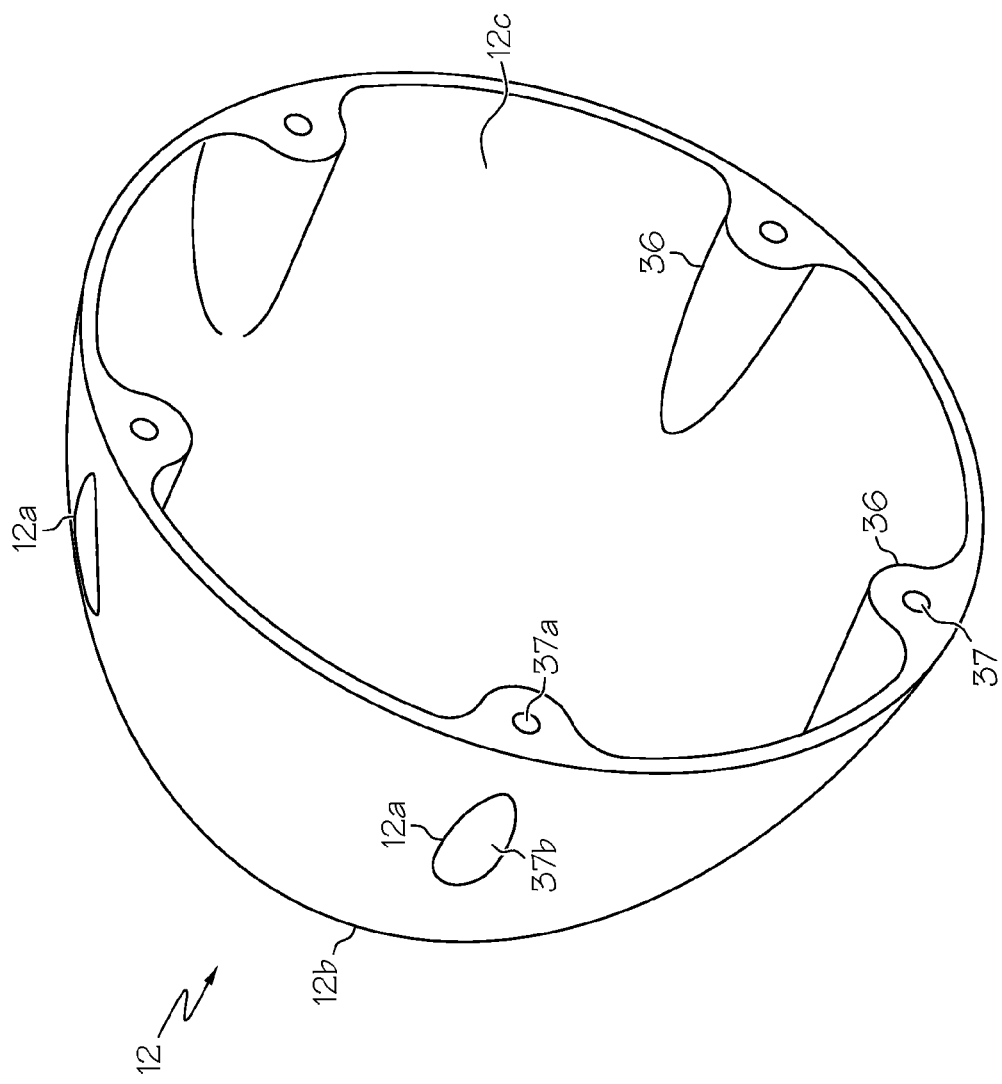
FIG. 2 is a perspective view of a nose cone in accordance with the invention.

Referring now to FIG. 2, a perspective view of the nose cone 12 is shown. The nose cone 12 may comprise mounting or attachment supports 36. The nose cone 12 may be attached to the turbomachine 10 with bolts (not shown) that pass through the attachment supports 36. The attachment supports 36 may comprise bolt apertures 37 having internal openings 37a and external openings 37b. The external openings 37b may develop a pocket 12a in an outer surface 12b of the nose cone 12 because of its conical shape. The pockets 12a may be particularly susceptible to undesirable icing.

Figure 3:
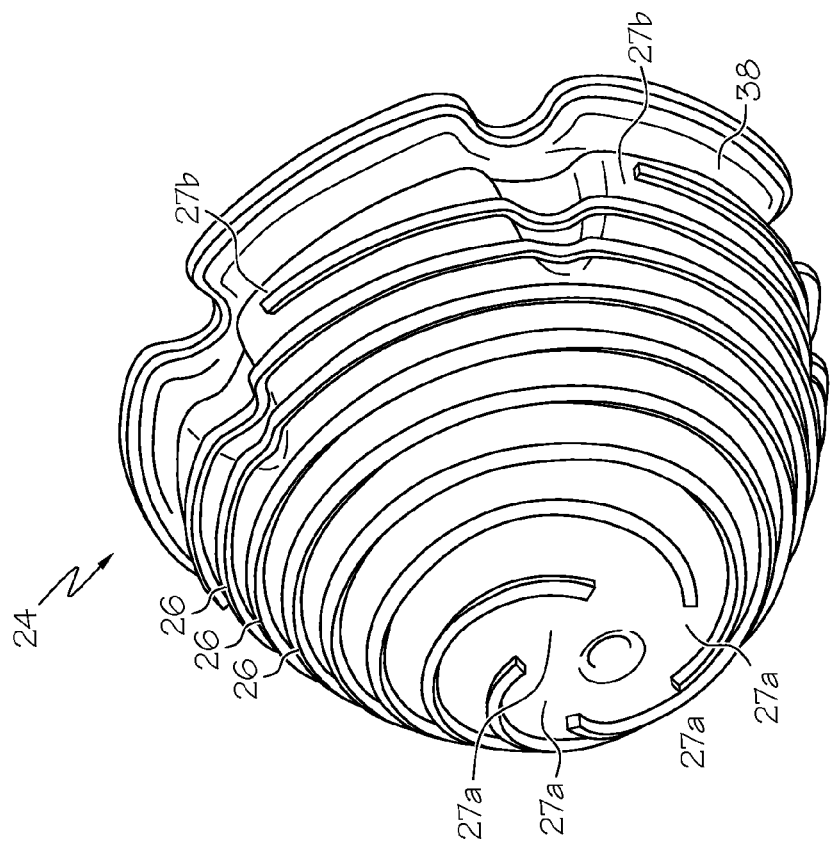
FIG. 3 is a perspective view of an inner shell in accordance with the invention.

Referring now to FIG. 3, it may be seen that the spacers 26 may have a spiral shape. After the nose cone 12 and inner shell 24 are assembled together, as shown in FIG. 1, the spiral spacers 26 may divide the space 25 into a plurality of spiral passages 27. The passages 27 may have an entrance end 27a at the distal end 32 of the nose cone 12 and an exit end 27b at the proximal end 30. These passages may be shaped so that the mixture 18 may be distributed to flow across an entire inner surface 12c of the nose cone 12. In that regard the passages 27 may be referred to as distributed passages 27. The distributed passages 27 may terminate at a manifold 40 (shown in FIG. 5) which may be formed by a circumferential groove 38 formed in the shell 24 and the inner surface 12c of the nose cone 12.

Figure 4:
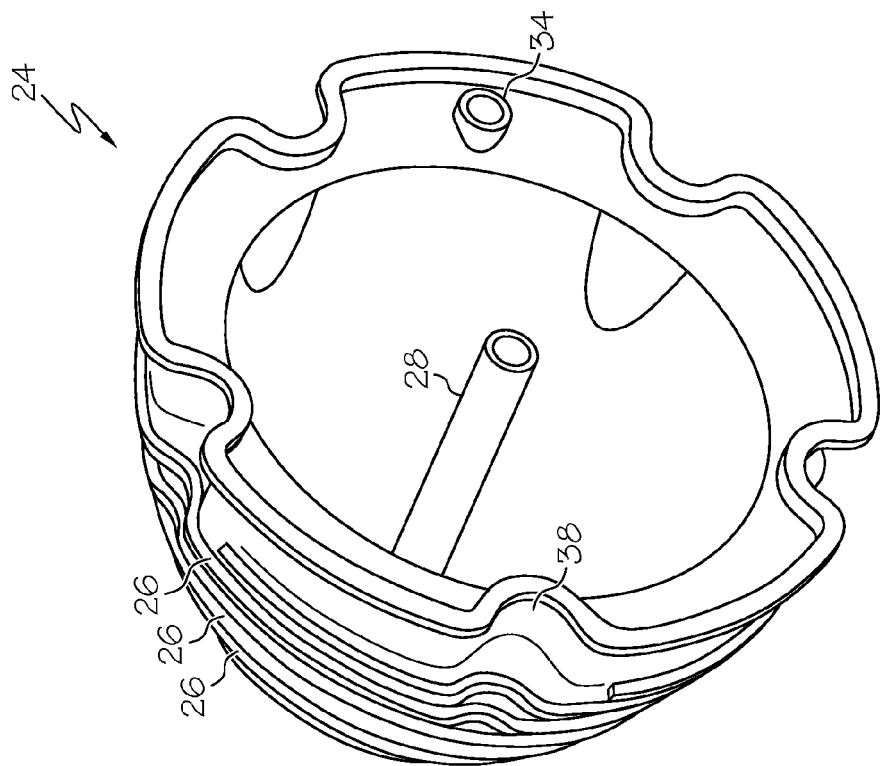
FIG. 4 is a perspective view of an inner shell in accordance with the invention.

Referring now to both FIG. 3 and FIG. 4, it may be seen that an inlet tube 28 may be attached to the inner shell 24. The inlet tube 28 may provide a pathway for the air-oil mixture 18 from the proximate end 30 of the nose cone 12 to the distal end 32 of the nosecone 12. As the mixture 18 continually reaches the distal end 30, the mixture 18 flow may divide into the spirally shaped distributed passages 27. As the mixture 18 traverses the passages 27, heat may be transferred from the mixture 18 into the nose cone 12.

As the mixture 18 flows through the distributed passages 27, it may experience a pressure drop. But, the pressure drop may be less than that produced in prior at systems. Unlike the prior-art serpentine tubing, the distributed passages 27 may permit a plurality of simultaneous and parallel flows to occur. An overall length of any one of the distributed passages 27 may be only about one fourth to about one fifth of the length of the prior art serpentine tubing. The length of the distributed passages may be varied by changing the twist of the spacers 26. The twist may be selected to provide for a desirable balance between a low pressure drop and providing sufficient heat transfer to insure ice-free operation at the worst expected condition.

As the divided flows of the mixture 18 continually emerge from the distributed passages 27, they may enter the manifold 40 to produce a full-volume flow. The full-volume flow of the mixture 18 may then continually traverse around the manifold 40 and transfer heat into the attachment supports 36. A full-volume of the flow of mixture 18 may produce enhanced heating of the attachment supports 36 which may be adjacent the manifold 40. Enhanced heating of the attachment supports 36 may be particularly desirable to counteract a high susceptibility of icing associated with the pockets 12a due to impinging water laden flow.

Figure 5:
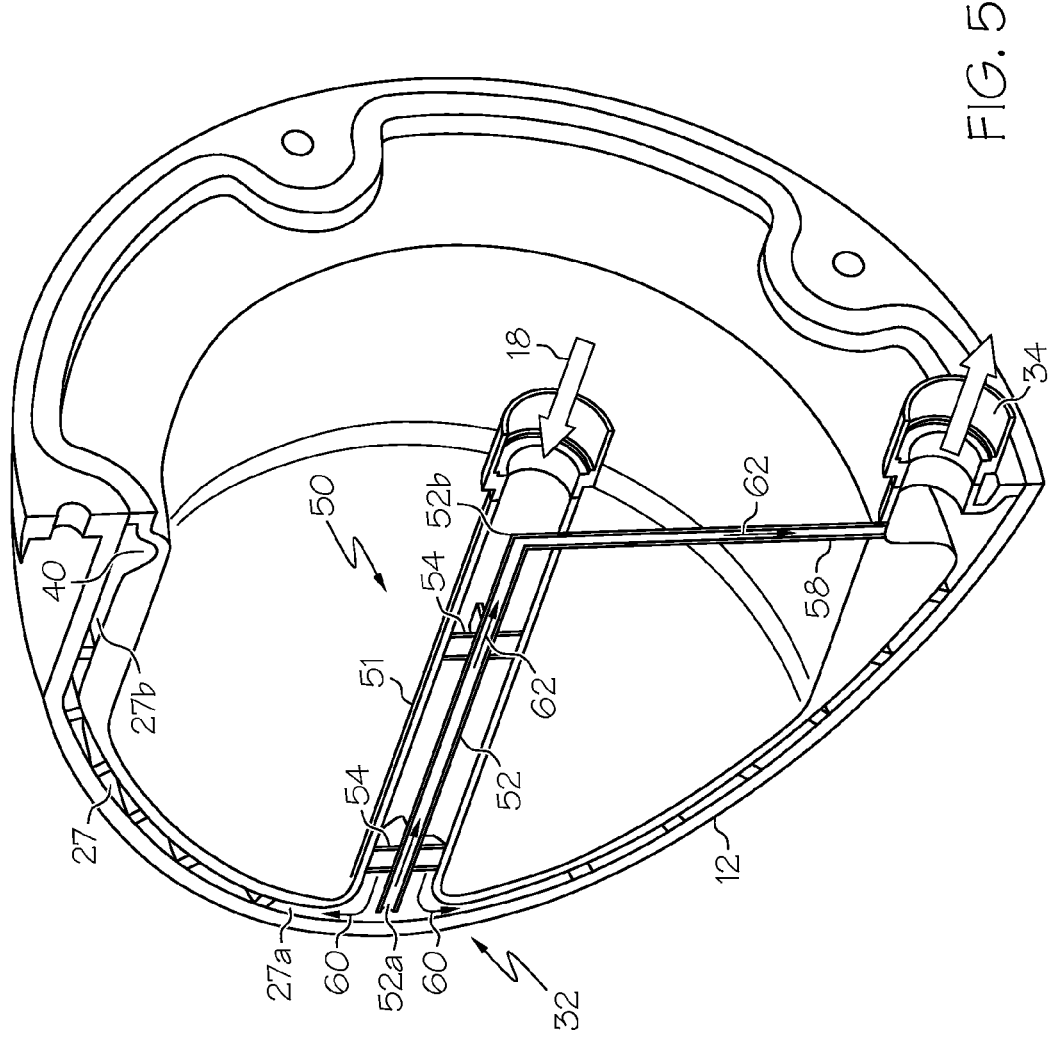
FIG. 5 is a perspective cross-section view of a portion of a deicing system in accordance with the invention.

Referring now to FIG. 5, a perspective view illustrates an embodiment of the nose cone 12 with an air-oil separator 50 that may separate some air from the air-oil mixture 18 as the mixture 18 is introduced into an inlet tube 51. An air venting tube 52 may be concentrically positioned within the inlet tube 51. The air venting tube 52 may be supported with spirally shaped rotation inducers 54. As the air-oil mixture 18 flows through the inlet tube 51, it may encounter the rotation inducers 54. The mixture 18 may then rotate about an axis of the inlet tube 51. Induced rotation may produce centrifugal forces on the mixture 18. These centrifugal forces may act differentially on air and oil. The more dense oil may be propelled outwardly radially within the tube 51. Air, on the other hand, may continue to follow a more centered flow through the tube 51. Consequently, an air to oil ratio of the mixture 18 may progressively change in the radial direction as the mixture 18 flows through the inlet tube 51. An oil enriched mixture may flow along an outer portion of the tube 51 and an air enriched mixture may tend to remain in a center portion of the tube 51. In other words, the air-oil mixture 18 may become divided into an oil-enriched mixture 60 and an air-enriched mixture 62. The air-enriched mixture 62 may preferentially flow into an entrance end 52a of the air venting tube 52 when it reaches the distal end 32 of the nose cone 12. The oil-enriched mixture 60, on the other hand, may flow radially outwards into the distributed passages 27.

An exit end 52b of the air venting tube 52 may be in communication with the manifold 40 through a connector tube 58. A conventional flow limiting orifice (not shown) may be placed within the connector tube 58 to meter flow of the oil-enriched mixture 60. The air-enriched mixture 62 may flow into the manifold 40 because a pressure drop may develop between the distal end 32 of the nose cone 12 and the manifold 40. The air-enriched mixture 62 may flow toward the lower pressure manifold 40 where it may re-combine with the oil-enriched mixture 60 and then return through exit 34 to the oil sump 14a of FIG. 1.

When the nose-cone 12 is heated with the oil-enriched mixture 60, as compared to the mixture 18, there may be more effective heat transfer. Also there may be a lower pressure drop in the oil-enriched mixture 60 as it traverses through the passages 27. A lower pressure drop may translate into a lower amount of required power from the oil pump 14b.

It must be noted that the rotation inducers 54 may produce a pressure drop within the flow of oil and air traversing the inlet tube 51. However, the pressure drop produced by the rotation inducers 54 may be only a small fraction of a differential in pressure drop associated with use of the oil-enriched mixture 60 instead of the mixture 18 for heating the nose cone 12. By way of example, the rotation inducers 54 may produce a pressure drop of about 0.5 psi to about 1.0 psid. Flow of the mixture 18 through the passages 27 may produce a pressure drop of 10 psid or more. Flow of the oil-enriched mixture 60 through the passages 27 may produce a pressure drop of only about 2 psid to about 5 psid. In other words, an expenditure of 0.5 to 1.0 psi pressure drop in the rotation inducers 54 may produce an overall 5 to 8 psi savings of pressure drop associated with a higher oil content mixture used for heating. Additionally, a higher oil content mixture may permit improvement of some design details. For example, spacing of the flow path may be changed to deliver improved performance and this may reduce the overall weight of a vehicle in which a heating system is installed.

In one embodiment of the present invention, a method is provided for de-icing a component of a turbomachine (e.g. the nose cone 12 of the turbomachine 10). In that regard the method may be understood by referring to FIG. 6. In FIG. 6, a flow chart portrays various aspects of an inventive method 600. In a step 602, a heating fluid (e.g. the air-oil mixture 18) may be delivered to the nose cone In a step 604 a flow of heating fluid may be divided into distributed flows (e.g. through the distributed passages 27). In a step 606, heat may be transferred from the heating fluid to the nose cone. In a step 608, the divided flows may be re-combined into a full-volume flow (e.g. in the manifold 40) and provide enhanced heating for attachment supports (e.g. the attachment supports 36). In a step 610, the heating fluid may be delivered to a sump (e.g. the oil sump 14a). In a step 612, oil may be pumped from the sump so that steps 602 through 610 may be performed. In other words the method 600 may be a closed loop process.

In another embodiment of the present invention heated lubricating oil with entrained air (e.g. the mixture 18) may be delivered to a separator (e.g. the separator 50) in a step 614. In a step 616 separation of some air may produce an oil-enriched mixture (e.g. the oil-enriched mixture 60) to be used as the heating fluid. The oil-enriched heating fluid produced in the step 616 may be introduced directly into step 604. The oil enriched heating fluid may then be employed to perform steps 604 through 610. In a step 618, an air-enriched mixture (e.g. the air-enriched mixture 62) that is separated in step 616 may be conveyed to the sump. In the step 612, the air-enriched mixture may be continually combined with the heating fluid from the step 610 and pumped from the sump.

It should be understood, of course, that the foregoing relates to exemplary embodiments of the invention and that modifications may be made without departing from the spirit and scope of the invention as set forth in the following claims.

We claim:

1. An apparatus for heating a component of a turbomachine comprising:
    an outer shell;
    an inner shell;
    the inner and outer shells positioned concentrically to provide a space between the shells; and
    spacers positioned in the space to form spiral distributed passages for flow of a heating fluid.

2. The apparatus of claim 1 wherein the outer shell comprises a nose cone of a turbine engine of an aircraft.

3. The apparatus of claim 1 wherein:
    the distributed passages are in communication with a source of lubricating oil of the turbomachine; and
    the heating fluid comprises some of the lubricating oil.

4. The apparatus of claim 3 wherein:
    the lubricating oil is driven into and emerges from an active lubrication region of the turbomachine; and
    some of the lubricating oil emerging from the active lubrication region flows through the distributed passages.

5. The apparatus of claim 1 comprising:
    a plurality of the spiral passages; and
    the spiral passages are concentric.

6. The apparatus of claim 1 further comprising:
    a collection manifold; and
    the distributed passages terminate into the manifold.

7. The apparatus of claim 6 wherein the collection manifold comprises a circumferential groove formed in the inner shell.

8. The apparatus of claim 6 wherein the collection manifold is contiguous with attachment supports, whereby the attachment supports are provided with enhanced heating.

9. An apparatus, comprising:
    a nose cone of a turbomachine adapted for communication with a source of a fluid mixture of lubricating oil and entrained air;
    a shell disposed concentrically within the nose cone; and
    an air-oil separator positioned within the nose cone including spacers forming distributed flow passages between the nose cone and the shell.

10. The apparatus of claim 9 further comprising:
    an inlet tube for the fluid mixture;
    a flow rotation inducer in the inlet tube;
    an air venting tube concentric with the inlet tube; and
    wherein the rotation inducer induces rotation into an incoming flow of the fluid mixture to propel some oil radially out of the incoming flow and remove some of the air from the fluid mixture, thereby increasing a proportionate oil content of the fluid mixture delivered to the flow passages for heating of the outer surface of the apparatus.

11. The apparatus of claim 9 wherein:
    the distributed flow passages have an entrance end and an exit end;
    an air venting tube has an entrance in communication with the entrance end of the distributed flow passages;
    the air venting tube has an exit end in communication with the exit ends of the distributed flow passages; and a pressure differential within the distributed flow passages produces a flow of air through the air venting tube toward the exit end of the distributed flow passages.

12. A method for de-icing a component of a turbomachine comprising the steps of:
- delivering a first mixture of engine lubricating oil and entrained air from an engine into a separator;
- separating some entrained air by continually imparting rotation to the first mixture in an inlet tube to produce an oil-enriched mixture for use as a heating fluid;
- delivering the oil-enriched mixture into the component as a heating fluid;
- dividing a flow of the heating fluid into distributed passages; and
- transferring heat from the heating fluid in the distributed passages into the component.

13. The method of claim 12 wherein:
- the component has a proximal end through which the first mixture enters;
- the component has a distal end; and
- the step of removing entrained air comprises:
  - continually propelling the first mixture through an inlet tube to produce the oil-enriched mixture;
  - continually removing the oil-enriched mixture from an exit end of the inlet tube at the distal end of the component;
  - continually collecting removed air at the distal end; and
  - continually conveying the collected air to the proximal end of the component.

14. The method of claim 12 wherein the step of transferring heat comprises continually propelling some of the oil-enriched mixture through a spiral passage.

15. The method of claim 12 wherein the step of separating entrained air comprises producing a pressure differential in a nose cone to propel air out of the nose cone.

16. The method of claim 12 wherein:
- the heating fluid is propelled along a plurality of spiral passages with exits at a manifold; and
- the heating fluid is continually gathered in the manifold before being conveyed out of the component.

17. The method of claim 16 comprising the further step of providing enhanced heating of attachment supports of the component by producing flow of the heating fluid in the manifold.

* * * * *